United States Patent
Shpak

(10) Patent No.: US 7,319,688 B2
(45) Date of Patent: *Jan. 15, 2008

(54) LAN WITH MESSAGE INTERLEAVING

(75) Inventor: Eran Shpak, Tel Aviv (IL)

(73) Assignee: Extricom Ltd., Herzeliya (IL)

( * ) Notice: Subject to any disclaimer, the term of this patent is extended or adjusted under 35 U.S.C. 154(b) by 1122 days.

This patent is subject to a terminal disclaimer.

(21) Appl. No.: 10/348,863

(22) Filed: Jan. 22, 2003

(65) Prior Publication Data

US 2003/0206535 A1 Nov. 6, 2003

Related U.S. Application Data

(63) Continuation-in-part of application No. 10/272,686, filed on Oct. 17, 2002, now Pat. No. 6,799,054, and a continuation-in-part of application No. 10/214,271, filed on Aug. 7, 2002.

(60) Provisional application No. 60/377,650, filed on May 6, 2002.

(51) Int. Cl.
*H04Q 7/24* (2006.01)

(52) U.S. Cl. ........................ 370/338; 370/349; 370/350

(58) Field of Classification Search ................ 370/328, 370/331–334, 338, 447, 461–462
See application file for complete search history.

(56) References Cited

U.S. PATENT DOCUMENTS

| | | | |
|---|---|---|---|
| 4,935,925 A | * | 6/1990 | Williams et al. ............ 370/428 |
| 5,280,472 A | | 1/1994 | Gilhousen et al. |
| 5,570,352 A | | 10/1996 | Poyhonen |
| 5,644,576 A | * | 7/1997 | Bauchot et al. ............. 370/338 |
| 5,842,117 A | | 11/1998 | Rosenberg et al. |
| 5,923,702 A | | 7/1999 | Brenner et al. |
| 5,960,344 A | | 9/1999 | Mahany |
| 5,982,779 A | * | 11/1999 | Krishnakumar et al. .... 370/447 |
| 6,028,866 A | * | 2/2000 | Engel et al. ................ 370/461 |
| 6,047,175 A | | 4/2000 | Trompower |
| 6,097,705 A | * | 8/2000 | Ben-Michael et al. ...... 370/315 |

(Continued)

OTHER PUBLICATIONS

IEEE Draft Supplement 802.11h, "Spectrum and Transmit Power Management Extensions in the 5 GHz Band in Europe", Publication P802.11h/D2.1 of the IEEE Standards Department, Piscataway, New Jersey, Jul. 2002.

(Continued)

*Primary Examiner*—Kwang Bin Yao
*Assistant Examiner*—Andrew Lai
(74) *Attorney, Agent, or Firm*—Welsh & Katz, Ltd.

(57) ABSTRACT

A method for mobile communication includes arranging a plurality of access points in a wireless local area network (WLAN) to communicate on a common frequency channel with a mobile station, and linking the access points together by cables in a wired local area network (LAN), so as to convey frames of data to and from the mobile station via the LAN. When one or more of the access points receive an uplink signal transmitted over the WLAN by the mobile station on the common frequency channel, the access points send messages over the LAN by interleaving the messages in one or more of the frames of the data, and arbitrate among themselves based on the messages so as to select one of the access points to respond to the uplink signal.

75 Claims, 7 Drawing Sheets

U.S. PATENT DOCUMENTS

| | | |
|---|---|---|
| 6,192,026 B1 | 2/2001 | Pollack et al. |
| 6,196,456 B1 | 3/2001 | Taylor |
| 6,259,898 B1 | 7/2001 | Lewis |
| 6,393,261 B1 | 5/2002 | Lewis |
| 6,463,303 B1 | 10/2002 | Zhao |
| 6,529,164 B1* | 3/2003 | Carter ................. 342/463 |
| 6,560,448 B1 | 5/2003 | Baldwin et al. |
| 6,567,396 B1* | 5/2003 | Pohjanvouri et al. ....... 370/349 |
| 6,580,704 B1 | 6/2003 | Wellig et al. |
| 6,590,884 B1 | 7/2003 | Panasik |
| 6,671,284 B1* | 12/2003 | Yonge et al. ............. 370/462 |
| 6,674,403 B2 | 1/2004 | Gray et al. |
| 6,771,933 B1 | 8/2004 | Eng et al. |
| 6,799,054 B2* | 9/2004 | Shpak ................... 455/525 |
| 6,907,229 B2 | 6/2005 | Shpak |
| 7,016,328 B2 | 3/2006 | Chari et al. |
| 7,113,498 B2 | 9/2006 | Bajic |
| 7,173,922 B2 | 2/2007 | Beach |
| 2002/0009982 A1 | 1/2002 | Kim |
| 2002/0048368 A1* | 4/2002 | Gardner .................. 380/277 |
| 2002/0061024 A1 | 5/2002 | Malkemes et al. |
| 2002/0114303 A1* | 8/2002 | Crosbie et al. ........... 370/338 |
| 2002/0188723 A1 | 12/2002 | Choi et al. |
| 2002/0197984 A1 | 12/2002 | Monin et al. |
| 2003/0003912 A1 | 1/2003 | Melpignano et al. |
| 2003/0007475 A1 | 1/2003 | Tsuda et al. |
| 2003/0012174 A1 | 1/2003 | Bender et al. |
| 2003/0063593 A1 | 4/2003 | Koyanagi et al. |
| 2003/0133422 A1* | 7/2003 | Bims ..................... 370/328 |
| 2003/0137959 A1 | 7/2003 | Nebiker et al. |
| 2003/0161340 A1 | 8/2003 | Sherman |
| 2003/0174681 A1 | 9/2003 | Gilberton et al. |
| 2003/0181221 A1 | 9/2003 | Nguyen |
| 2003/0210674 A1 | 11/2003 | Honkasalo et al. |
| 2003/0227893 A1 | 12/2003 | Bajic |
| 2003/0235170 A1 | 12/2003 | Trainin |
| 2004/0076134 A1 | 4/2004 | Barber et al. |
| 2004/0157624 A1 | 8/2004 | Hrastar |
| 2004/0170154 A1 | 9/2004 | Carter et al. |
| 2005/0018630 A1 | 1/2005 | Bianchi et al. |
| 2005/0021586 A1 | 1/2005 | Bichot et al. |
| 2005/0170824 A1 | 8/2005 | Dowling |

OTHER PUBLICATIONS

ANSI/IEEE Standard 801.11 (1999 Edition), Part 11: Wireless LAN Medium Access Control (MAC) and Physical Layer (PHY) Specifications.

* cited by examiner

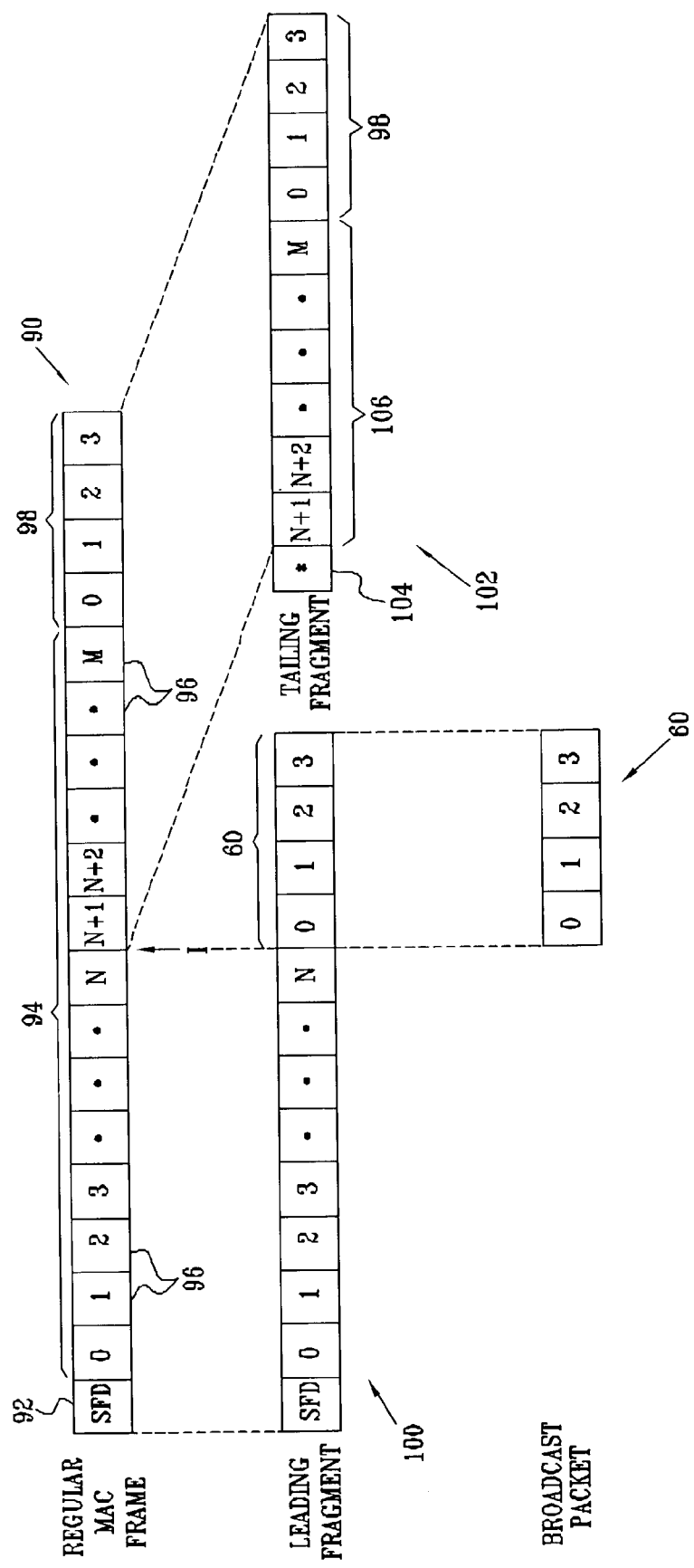

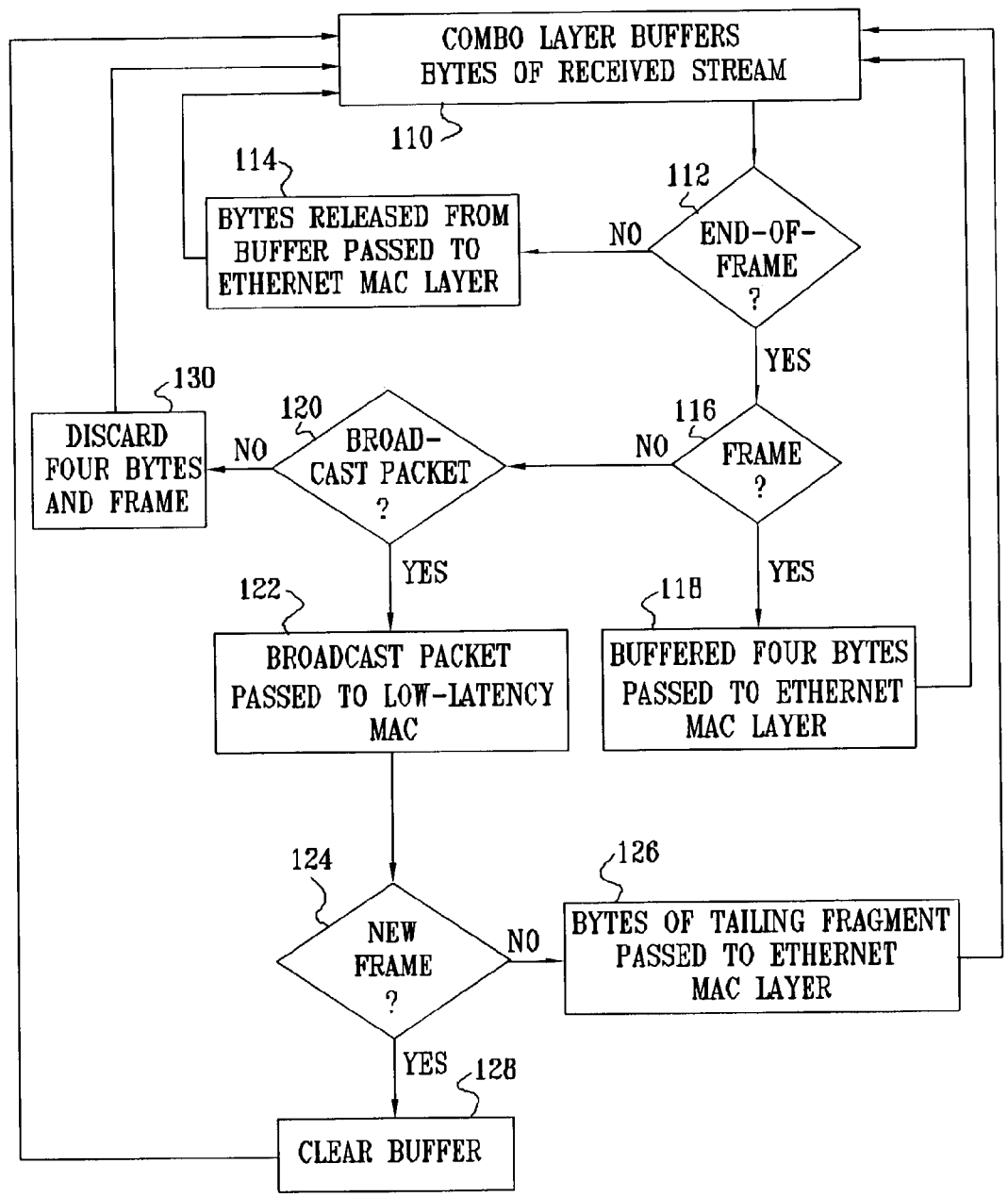

LAN WITH MESSAGE INTERLEAVING

CROSS-REFERENCE TO RELATED APPLICATION

This application is a continuation-in-part of U.S. patent application Ser. No. 10/272,686, entitled, "Collaboration between Wireless LAN Access Points using Wired LAN Infrastructure," filed Oct. 17, 2002, now U.S. Pat. No. 6,799,054 which claims the benefit of U.S. Provisional Patent Application No. 60/377,650, filed May 6, 2002, and is a continuation-in-part of U.S. patent application Ser. No. 10/214,271, filed Aug. 7, 2002. The disclosures of all of these applications are incorporated herein by reference.

FIELD OF THE INVENTION

The present invention relates generally to local area network (LAN) communications, and specifically to methods and devices for improving the performance of wireless LANs.

BACKGROUND OF THE INVENTION

Wireless local area networks (WLANs) are gaining in popularity, and new wireless applications are being developed. The original WLAN standards, such as "Bluetooth" and IEEE 802.11, were designed to enable communications at 1-2 Mbps in a band around 2.4 GHz. More recently, IEEE working groups have defined the 802.11a, 802.11b and 802.11g extensions to the original standard, in order to enable higher data rates. The 802.11a standard, for example, envisions data rates up to 54 Mbps over short distances in a 5 GHz band, while 802.11b defines data rates up to 22 Mbps in the 2.4 GHz band. In the context of the present patent application and in the claims, the term "802.11" is used to refer collectively to the original IEEE 802.11 standard and all its variants and extensions, unless specifically noted otherwise.

The theoretical capability of new WLAN technologies to offer enormous communication bandwidth to mobile users is severely hampered by the practical limitations of wireless communications. Indoor propagation of radio frequencies is not isotropic, because radio waves are influenced by building layout and furnishings. Therefore, even when wireless access points are carefully positioned throughout a building, some "black holes" generally remain—areas with little or no radio reception. Furthermore, 802.11 wireless links can operate at full speed only under conditions of high signal/noise ratio. Signal strength scales inversely with the distance of the mobile station from its access point, and therefore so does communication speed. A single mobile station with poor reception due to distance or radio propagation problems can slow down WLAN access for all other users in its basic service set (BSS—the group of mobile stations communicating with the same access point).

The natural response to these practical difficulties would be to distribute a greater number of access points within the area to be served. If a receiver receives signals simultaneously from two sources of similar strength on the same frequency channel, however, it is generally unable to decipher either signal. The 802.11 standard provides a mechanism for collision avoidance based on clear channel assessment (CCA), which requires a station to refrain from transmitting when it senses other transmissions on its frequency channel. In practice, this mechanism is of limited utility and can place a heavy burden on different BSSs operating on the same frequency channel.

Therefore, in high data-rate 802.11 WLANs known in the art, access points in mutual proximity must use different frequency channels. Theoretically, the 802.11b and 802.11g standards define 14 frequency channels in the 2.4 GHz band, but because of bandwidth and regulatory limitations, WLANs operating according to these standards in the United States actually have only three different frequency channels from which to choose. (In other countries, such as Spain, France and Japan, only one channel is available.) As a result, in complex, indoor environments, it becomes practically impossible to distribute wireless access points closely enough to give strong signals throughout the environment without substantial overlap in the coverage areas of different access points operating on the same frequency channel.

Access points in a WLAN system are typically interconnected by a wired LAN to communicate with a hub. The LAN serves as a distribution system (DS) for exchanging data between the access points and the hub. This arrangement enables the mobile stations to send and receive data through the access points to and from external networks, such as the Internet, via an access line connected to the hub.

Most commonly, the LAN used as a DS is an Ethernet LAN, operating in accordance with the Carrier Sense Multiple Access with Collision Detection (CSMA/CD) method of media access control (MAC) defined in IEEE Standard 802.3 (2000 Edition), which is incorporated herein by reference. The terms "Ethernet," "CSMA/CD" and "802.3" are used in the art interchangeably to refer to LANs of this type. Ethernet LANs are typically capable of carrying data at high speeds—greater than the aggregate speed of wireless communications between the access points and mobile stations. For example, a 100BASE-T Ethernet LAN is capable of carrying data over twisted pair cabling at 100 Mb/s. Message latency on the LAN is relatively high, however, generally on the order of milliseconds, due in part to the lack of a fragmentation mechanism at the 802.3 MAC layer. Another factor contributing to latency in Ethernet LANs is that the minimum frame size permitted by the standard is 64 bytes (plus 8 more bytes for the frame preamble and start frame delimiter), while the maximum frame size is more than 1500 bytes. Both preamble and minimum frame size are required for backward compatibility with legacy 10 Mb/s Ethernet over half-duplex media.

SUMMARY OF THE INVENTION

It is an object of some aspects of the present invention to provide methods and devices for enhancing the coverage and speed of WLAN systems.

It is a further object of some aspects of the present invention to provide methods and devices that enable a wired LAN to be used for high-speed, low-latency communications.

It is also an object of the some aspects of the present invention to provide methods and devices that enable a conventional LAN to simultaneously support regular LAN communications and lower-latency communications for short, urgent messages.

In some embodiments of the present invention, a WLAN system comprises multiple wireless access points distributed within a service region. The access points are linked together by cables in a local area network (LAN), typically an Ethernet LAN, which conveys data to and from mobile stations served by the access points. In order to provide complete coverage of the service region, with strong communication signals throughout the region, the access points are typically closely spaced, and their areas of coverage may substantially overlap one another, unlike WLANs known in the art.

In order to deal with this overlap, the access points communicate among themselves using a novel, low-latency fragmentation-reassembly protocol over the LAN. When a mobile station sends an uplink message attempting to initiate communications in a given frequency channel, a number of access points operating in this frequency channel may typically receive the uplink message. These access points arbitrate among themselves by sending short messages over the LAN, using the novel protocol to determine which access point will respond to the mobile station. The arbitration must be completed promptly, typically in a time well below 10 µs. If the access points were limited to communicating over the LAN using Ethernet protocols, they would be unable to complete the arbitration within this tight limit because of the high latency inherent in Ethernet MAC, as described above. Therefore, each access point receiving the uplink message preempts its Ethernet communications immediately, and uses the novel fragmentation-reassembly protocol of the present invention instead to send and receive the short messages necessary for arbitration. Standard Ethernet transmissions resume immediately afterwards.

If an access point or other node on the LAN is in the midst of transmitting an Ethernet frame when the need arises to send an arbitration message, it preempts Ethernet communications by interleaving the arbitration message with the Ethernet frame. Typically, the Ethernet frame is broken into two frame fragments, and the arbitration message is appended at the end of the leading fragment. Receivers of the frame fragments extract the arbitration message and reassemble the frame by combining the frame fragments. Thus, the preemption does not cause any Ethernet frames to be discarded and reduces the available Ethernet bandwidth only minimally.

The use of the arbitration mechanism of the present invention allows access points to be deployed within the service region as closely as desired while avoiding mutual interference. As a result, mobile stations everywhere in the service region experience good radio coverage, without "black holes," and can operate at optimal speed. Since the arbitration messaging among the access points takes advantage of an existing LAN among the access points (or a LAN that would be deployed as a DS for the WLAN in any case), the improved performance of the WLAN is achieved without substantial changes to existing infrastructure, without substantial added hardware, and by means of a very simple installation procedure.

Although the embodiments described herein are directed primarily to improving the coverage of WLAN systems, the principles of the present invention may be applied for other purposes, as well. Thus, the present invention may be employed to provide nodes in a LAN with dual MAC capabilities: a high-throughput MAC layer, such as a 100 Mb/s Ethernet MAC layer, used for general data communications; and a separate low-latency MAC layer, which is invoked when needed for sending short, high-priority messages, which are typically a microsecond or less in duration. The high-speed MAC can be used, for example, for synchronization and control signals that require low latency, and therefore cannot be carried over Ethernet. Ordinarily, in the absence of the low-latency MAC, additional cabling among the nodes would be required to carry these signals. The present invention resolves this deficiency of the prior art, allowing LAN cabling and equipment to be used for dual purposes.

There is therefore provided, in accordance with an embodiment of the present invention, a method for mobile communication, including:

arranging a plurality of access points in a wireless local area network (WLAN) to communicate on a common frequency channel with a mobile station;

linking the access points together by cables in a wired local area network (LAN), so as to convey frames of data to and from the mobile station via the LAN;

receiving at one or more of the access points an uplink signal transmitted over the WLAN by the mobile station on the common frequency channel;

responsively to receiving the uplink signal, sending one or more messages over the LAN among the access points by interleaving the messages in one or more of the frames of the data;

arbitrating among the access points based on the messages so as to select one of the access points to respond to the uplink signal; and transmitting a response from the selected one of the access points to the mobile station.

In an embodiment, sending the one or more messages includes breaking at least one of the frames of the data into a leading fragment and a tailing fragment, and appending one of the messages to the leading fragment. Breaking the at least one of the frames of the data may include beginning the tailing fragment with a Start Frame Delimiter (SFD) different from the SFD normally used to begin a frame of data.

In an embodiment, arbitrating among the access points includes receiving the one or more messages at the plurality of access points by screening the frames of data so as to detect the one or more messages, and, responsively to such detection, extracting the one or more messages from the one or more of the frames of the data. For some applications, screening the frames of data includes determining whether a sequence of bits in one of the frames represents a valid error detection code for a portion of the frame. Receiving the one or more messages may include temporarily holding a portion of the data in one of the frames in a first-in-first-out buffer during the screening.

For some applications, sending the one or more messages by interleaving includes temporarily holding a portion of the data in the one or more frames in a first-in-first-out buffer during the interleaving.

In an embodiment, linking the access points to convey the frames of the data includes configuring the access points to convey the frames in accordance with a first media access control (MAC) protocol characterized by a first latency, and sending the messages includes using a second MAC protocol, having a second latency lower than the first latency, to send the messages responsively to receiving the uplink signal. The first MAC protocol may include an Ethernet protocol. For some applications, linking the access points to convey the frames of the data includes passing the frames in accordance with a standard Media-Independent Interface (MII) between physical and MAC layers of the Ethernet protocol.

In an embodiment, sending the one or more messages includes sending broadcast messages from the access points receiving the uplink signal to the plurality of the access points. For some applications, linking the access points together includes linking each of the access points to a hub via the LAN, and sending the broadcast messages includes sending the broadcast messages from the access points receiving the uplink signal to the hub, and from the hub to the plurality of the access points.

In an embodiment, arbitrating among the access points includes receiving and processing the messages at each of the plurality of the access points, so that each of the one or more of the access points receiving the uplink signal determines which one of the access points is to be selected to respond to the uplink signal. Processing the messages may include selecting, responsively to the messages, the one of the access points that was first to receive the uplink signal.

In an embodiment, the access points have respective service areas, and arranging the plurality of the access points includes arranging the access points so that the service areas substantially overlap. For some applications, arranging the plurality of the access points includes arranging the access points to communicate with the mobile station substantially in accordance with IEEE Standard 802.11. Arbitrating among the access points may include selecting the one of the access points to respond to the uplink signal within a time limit imposed by the IEEE Standard 802.11 for acknowledging the uplink signal.

There is also provided, in accordance with an embodiment of the present invention, a method for network communication, including:

linking a plurality of nodes together in a local area network (LAN);

conveying frames of data among the nodes via the LAN in accordance with a first media access control (MAC) protocol; and sending a message among the nodes over the LAN using a second MAC protocol by interleaving the message in one of the frames of the data.

In an embodiment, sending the message includes breaking the frame of the data into a leading fragment and a tailing fragment, and appending the message to the leading fragment. Breaking the frame of the data may include beginning the tailing fragment with a Start Frame Delimiter (SFD) different from the SFD normally used to begin a frame of data.

For some applications, sending the message includes receiving the message by screening the frames of data so as to detect the message, and, responsively to such detection, extracting the message from the frames of the data. Screening the frames of data may include determining whether a sequence of bits in one of the frames represents a valid error detection code for a portion of the frame. For some applications, receiving the message includes temporarily holding a portion of the data in one of the frames in a first-in-first-out buffer during the screening.

For some applications, sending the message by interleaving includes temporarily holding a portion of the data in the one of the frames in a first-in-first-out buffer during the interleaving.

In an embodiment, the first MAC protocol is characterized by a first latency, and the second MAC protocol is characterized by a second latency lower than the first latency. The first MAC protocol may include an Ethernet protocol. For some applications, conveying the frames of the data includes passing the frames in accordance with a standard Media-Independent Interface (MII) between physical and MAC layers of the Ethernet protocol.

There is further provided, in accordance with an embodiment of the present invention, a system for mobile communication, including:

cables arranged to form a wired local area network (LAN); and a plurality of access points interconnected by the LAN and arranged in a wireless local area network (WLAN) to communicate on a common frequency channel with a mobile station, the access points being adapted to convey frames of data to and from the mobile station via the LAN, and, upon receiving at one or more of the access points an uplink signal transmitted over the WLAN by the mobile station on the common frequency channel, to send one or more messages over the LAN among the access points by interleaving the messages in one or more of the frames of the data, responsively to receiving the uplink signal, and to arbitrate among the access points based on the messages so as to select one of the access points to respond to the uplink signal, and to transmit a response from the selected one of the access points to the mobile station.

There is still further provided, in accordance with an embodiment of the present invention, a system for network communication, including:

cables arranged to form a wired local area network (LAN); and a plurality of nodes, which are linked together by the LAN and are adapted to convey frames of data among the nodes via the LAN in accordance with a first media access control (MAC) protocol, and which are further adapted to send a message among the nodes over the LAN using a second MAC protocol by interleaving the message in one of the frames of the data.

There is additionally provided, in accordance with an embodiment of the present invention, access point apparatus for deployment in a wireless local area network (WLAN) as one of a plurality of access points for mobile communication, the apparatus including:

a radio transceiver, which is configured to communicate on a predetermined frequency channel with a mobile station;

a physical layer interface, for connecting the access point to a wired local area network (LAN) interconnecting the access points; and processing circuitry, which is adapted to convey frames of data to and from the mobile station via the physical layer interface over the LAN, and, when the transceiver receives an uplink signal transmitted over the WLAN by the mobile station on the predetermined frequency channel, to send and receive messages via the physical layer interface over the LAN to and from the plurality of access points by interleaving the messages in one or more of the frames of the data, and to perform an arbitration among the access points based on the messages so as to select one of the access points to respond to the uplink signal, and to control the transceiver so that the transceiver returns a response to the mobile station subject to the arbitration.

There is yet additionally provided, in accordance with an embodiment of the present invention, node apparatus for deployment as one of a plurality of nodes in a local area network (LAN), the apparatus including:

a physical layer interface, for connecting the node to the LAN; and processing circuitry, which is adapted to convey frames of data among the nodes via the physical layer interface over the LAN in accordance with a first media access control (MAC) protocol, and which is further adapted to send a message among the nodes over the LAN using a second MAC protocol by interleaving the message in one of the frames of the data.

The present invention will be more fully understood from the following detailed description of the embodiments thereof, taken together with the drawings in which:

BRIEF DESCRIPTION OF THE DRAWINGS

FIG. 7 is a block diagram that schematically illustrates the interleaving of a broadcast packet into a regular MAC frame, in accordance with an embodiment of the present invention; and FIG. 8 is a flow chart that schematically illustrates a method for screening and extracting broadcast packets from a regular Ethernet stream of octets, in accordance with an embodiment of the present invention.

DETAILED DESCRIPTION OF EMBODIMENTS

Figure 1:
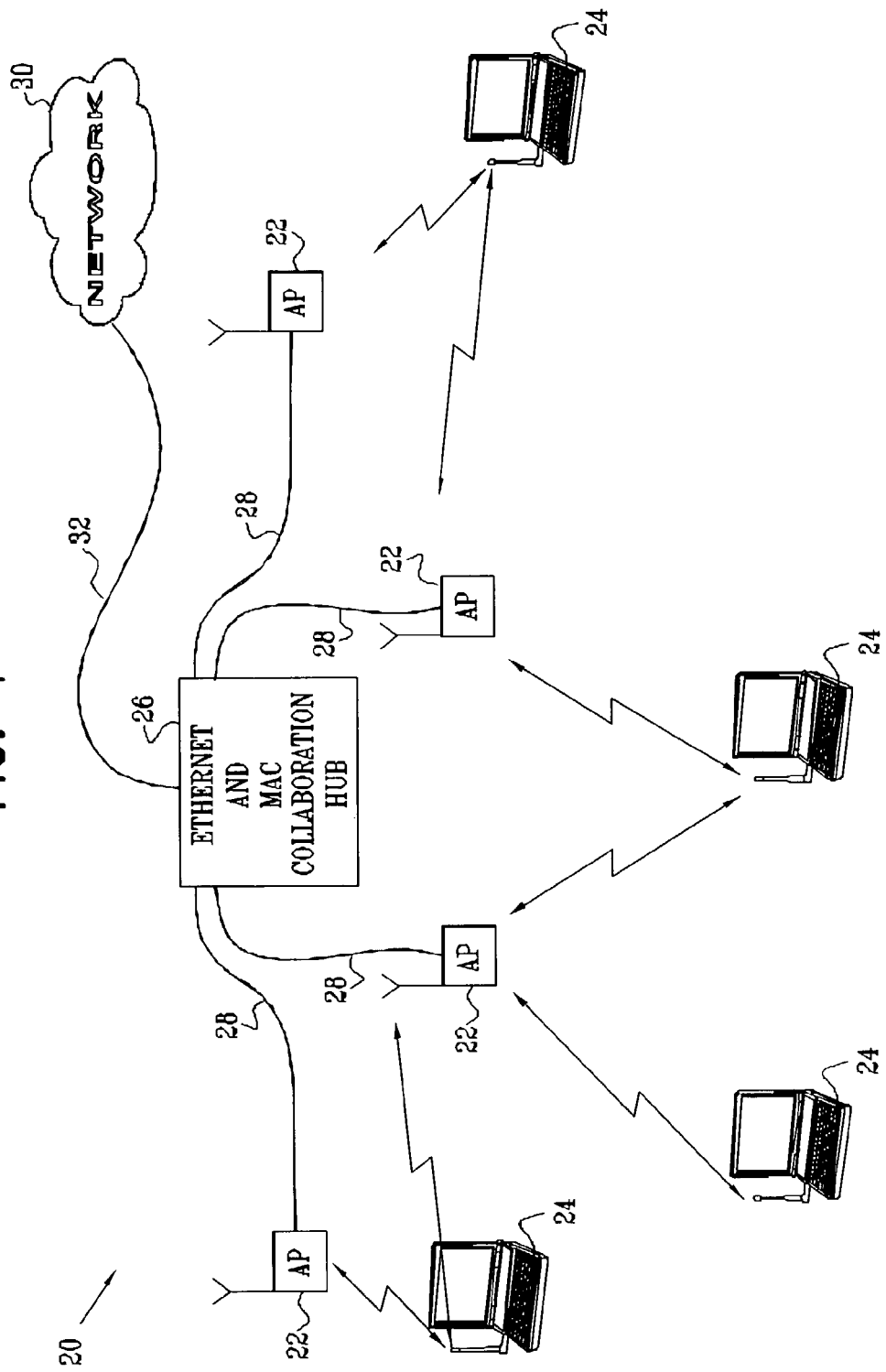
FIG. 1 is a block diagram that schematically illustrates a WLAN system, in accordance with an embodiment of the present invention.

FIG. 1 is a block diagram that schematically illustrates a wireless LAN (WLAN) system 20, in accordance with an embodiment of the present invention. System 20 comprises multiple access points 22, which are configured for data communication with mobile stations 24. The mobile stations typically comprise computing devices, such as desktop, portable or handheld devices, as shown in the figure. In the exemplary embodiments described hereinbelow, it is assumed that the access points and mobile stations communicate with one another in accordance with one of the standards in the IEEE 802.11 family and observe the 802.11 medium access control (MAC) layer conventions. Details of the 802.11 MAC layer are described in ANSI/IEEE Standard 801.11 (1999 Edition), and specifically in Part 11: Wireless LAN Medium Access Control (MAC) and Physical Layer (PHY) Specifications, which is incorporated herein by reference. The principles of the present invention, however, are not limited to the 802.11 standards, and may likewise be applied to substantially any type of WLAN, including HiperLAN, Bluetooth and hiswan-based systems.

Access points 22 are connected to an Ethernet switching hub 26 by a wired LAN 28, which serves as the distribution system (DS) for exchanging data between the access points and the hub. As noted above, this arrangement enables mobile stations 24 to send and receive data through access points 22 to and from an external network 30, such as the Internet, via an access line 32 connected to hub 26. LAN 28 is typically a 100BASE-TX LAN, operating in full-duplex mode between each access point and the hub, as specified by the 802.3 standard. Alternatively, LAN 28 may comprise substantially any Ethernet standard LAN.

As described in the above-mentioned U.S. patent application Ser. No. 10/214,271, access points 22 in system 20 are preferably closely spaced, so that radio waves may typically reach mobile station 24 from multiple access points simultaneously on the same frequency channel. By the same token, radio messages transmitted by mobile station 24 may be received at about the same time by multiple access points. In WLAN systems known in the art, under these circumstances, mobile station 24 would receive downlink messages from two or more of the access points, which would probably result in inability of the mobile station to communicate with any of the access points. In embodiments of the present invention, the access points collaborate to resolve this conflict by exchanging arbitration messages with one another using a novel, high-speed protocol over LAN 28, as described hereinbelow. Typically, the arbitration messages are broadcast by all the access points that receive an uplink signal from a given mobile station, to all the other access points. Based on the arbitration messages, the access points decide which access point is to serve a given mobile station (usually the closest access point to the mobile station, meaning the first access point to send out an arbitration message over LAN 28 in response to a given uplink message). The other access points meanwhile refrain from interfering.

Ordinarily, in a conventional WLAN, when an access point receives an uplink message from a mobile station, it answers immediately with an acknowledgment (ACK). If the mobile station does not receive the ACK within a given timeout period (known as the interframe space, or IFS), typically 10 μs, it subsequently submits an automatic repeat request (ARQ). Ultimately, the mobile station will treat the message exchange as having failed if it repeatedly does not receive the required ACK. Therefore, to maintain 802.11 compatibility in system 20, one—and only one—of the receiving access points must return an ACK to mobile station 24 within the 10 μs limit. This constraint requires that the arbitration process among the access points be completed in substantially less than 10 μs. For this purpose, access points 22 are provided with dual MAC functions: an Ethernet MAC for conventional data communications, and a novel low-latency MAC for arbitration, as described below.

Figure 2:
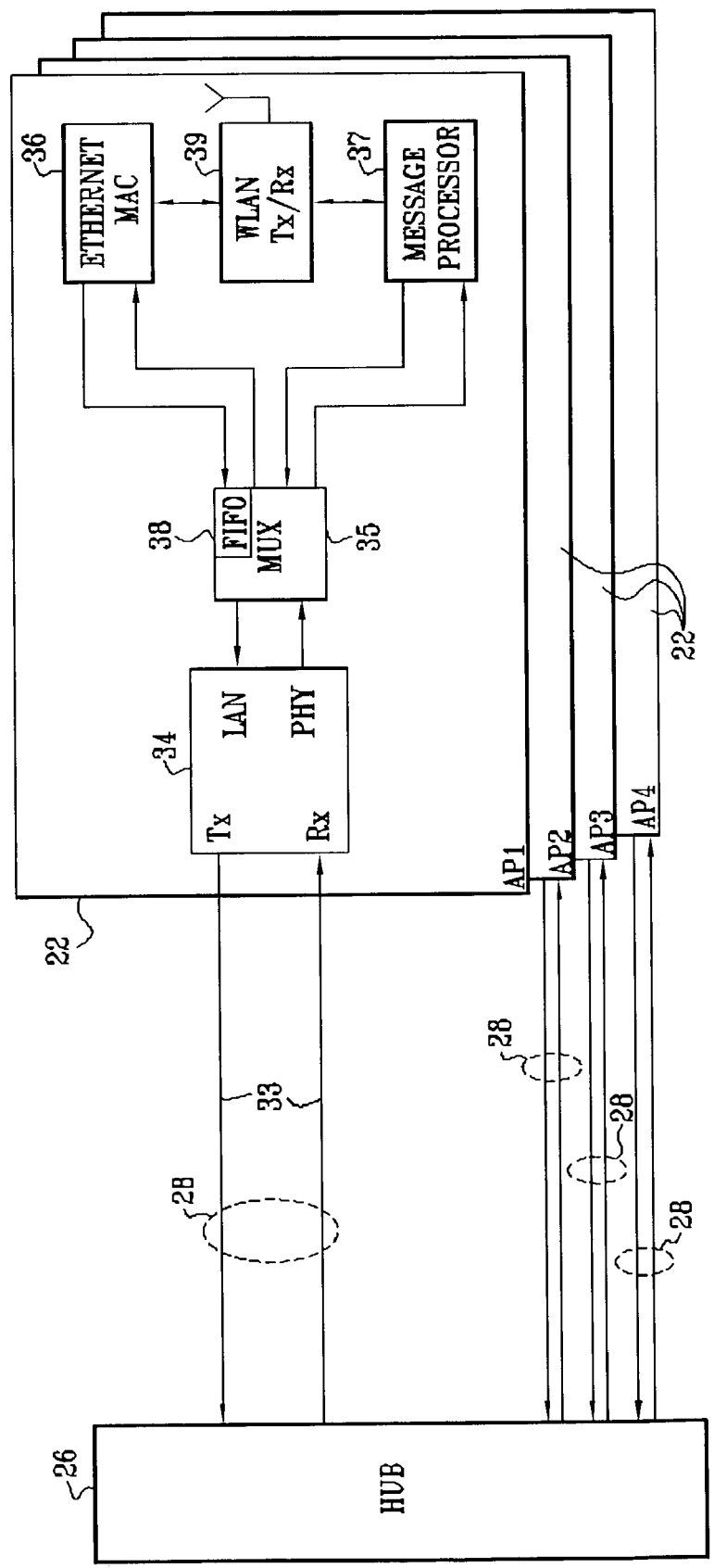
FIG. 2 is a block diagram that schematically shows details of access points in a WLAN system, in accordance with an embodiment of the present invention.

FIG. 2 is a block diagram that schematically shows details of access points 22, in accordance with an embodiment of the present invention. Access point 22 is connected to hub 26 by wires 33 of LAN 28. Hub 26 typically comprises a standard Ethernet switching hub, as is known in the art, which is additionally programmed to recognize and rapidly switch the (non-Ethernet MAC) arbitration messages exchanged among the access points, using a novel combination ("COMBO") layer described hereinbelow with reference to FIG. 3. Access point 22 typically comprises an unmodified physical layer interface (PHY) 34, which transmits and receives signals over wires 33 in accordance with the 100BASE-X PHY layer specification of the 802.3 standard (typically using the 100BASE-TX full PHY). Typically, PHY 34 operates in a full-duplex mode between access points 22 and hub 26, as provided by the standard.

A multiplexer 35 attaches PHY 34 to two different MAC processors: a conventional Ethernet frame processor 36 and a collaboration message processor 37. Multiplexer 35 is programmed to interleave arbitration messages, generated by the message processor, into regular MAC frames generated by the frame processor, and to extract arbitration messages from received modified MAC frames. (These functions are described hereinbelow with reference to FIGS. 6, 7 and 8.) Typically, multiplexer 35 comprises a first-in-first-out (FIFO) buffer 38 of nibbles, as specified by the Ethernet Media-Independent Interface (MII) and described hereinbelow with reference to FIGS. 6 and 7. (Alternatively, some Ethernet varieties use dibits, rather than nibbles, as their basic unit of data.) As a rule, the multiplexer gives priority to delivering outgoing arbitration messages from the message processor, interrupting any transmission of pending Ethernet frames in the meanwhile and buffering the output of the frame processor if necessary. Hub 26 also uses these interleaving techniques to send arbitration messages to access points 22. Based on these arbitration messages, processor 37 interacts with and controls a WLAN transceiver 39. Transceivers 39 communicate over the air with mobile stations 24 in accordance with the applicable WLAN standard.

The elements of access point 22 shown in FIG. 2 may comprise individual, separate components, or they may alternatively be combined together in a single integrated circuit chip or chip set. Although multiplexer 35 and message processor 37 are novel and unique to the present invention, other elements of the access point shown in FIG. 2 (including Ethernet frame processor 36, PHY 34, and transceiver 39) are typically available off-shelf as standard components. The multiplexer, Ethernet frame processor and message processor may also be implemented as software processes running on a single microprocessor, as long as the processing speed of the microprocessor is sufficient.

Figure 3:
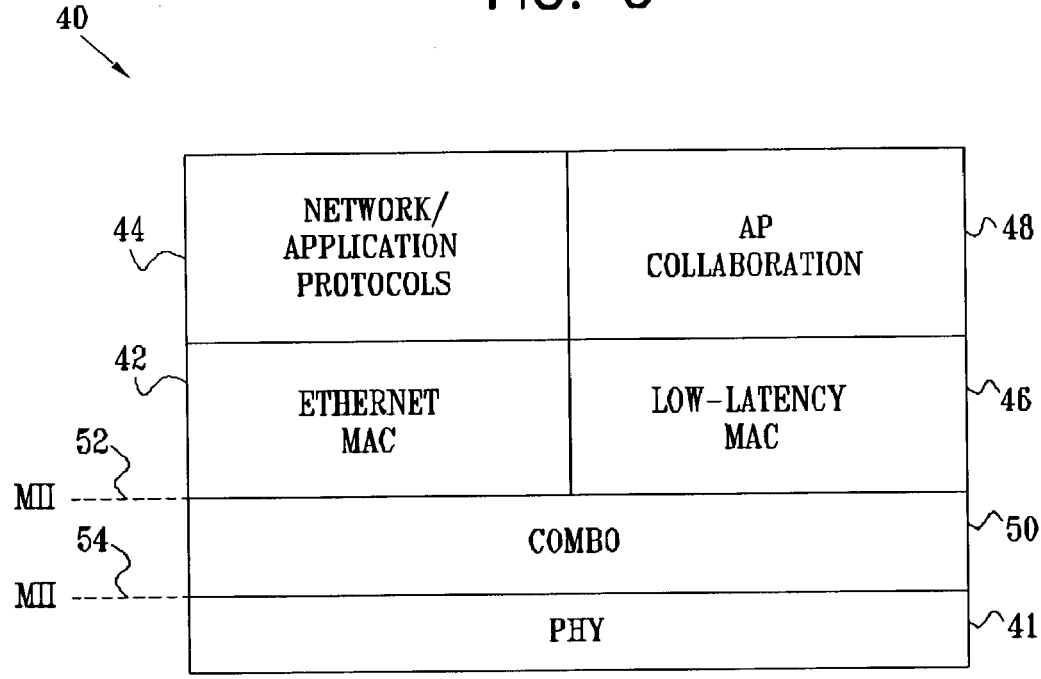
FIG. 3 is a block diagram that schematically illustrates a communication protocol stack with dual MAC layers, in accordance with an embodiment of the present invention.

FIG. 3 is a block diagram that schematically illustrates a protocol stack 40 implemented by the components of access point 22, in accordance with an embodiment of the present invention. The lower layers of protocol stack 40 are also implemented by hub 26, although for the sake of simplicity details of the stack are described herein only with respect to access point 22. PHY 34 implements a standard physical layer protocol 41, in accordance with the 802.3 standard, such as the 100BASE-TX protocol. Ethernet frame processor 36 implements a standard 802.3 MAC protocol 42, which interfaces with higher-level network and application layers 44. Higher layers 44 are responsible for conveying data to and from mobile stations 24 between WLAN transceiver 39 and LAN 28. These conventional functions are beyond the scope of the present invention, and their implementation will be apparent to those skilled in the art.

Message processor 37, on the other hand, uses a novel low-latency MAC protocol 46 for arbitration messaging among the access points. Low-latency MAC 46 interfaces with an access point (AP) collaboration layer 48, which is responsible for generating arbitration messages to be transmitted over LAN 28 and for receiving and processing incoming arbitration messages from other access points. AP layer 48 uses the arbitration message information to determine which of the access points should respond to a given uplink message received by transceiver 39 and outputs control signals to the transceiver accordingly. These operations are described further hereinbelow with reference to FIGS. 5-8.

A combination (COMBO) layer 50 is provided by multiplexer 35 to interface between lower protocol layers and alternative MAC protocols 42 and 46. COMBO layer 50 typically uses a Media-Independent Interface (MII) 52 to interface with Ethernet MAC layer 42, and optionally with low-latency MAC 46, as well. (For some applications, MII 52 comprises a reduced MII (RMII).) The MII, as defined in detail in Clause 22 of the 802.3 standard, provides standard primitives for communication between the Ethernet MAC layer and the PHY layer of 100BASE-X (including 100BASE-TX). By accepting these primitives from the Ethernet MAC layer in the manner provided by the 802.3 standard, the operation of COMBO layer 50 is transparent to the Ethernet MAC layer. In other words, the Ethernet MAC layer operates in the conventional fashion, and need not be modified to accommodate low-latency MAC 46. COMBO layer 50 typically interfaces with PHY 41 using a standard MII 54 (or reduced MII) of the PHY.

Figure 4:
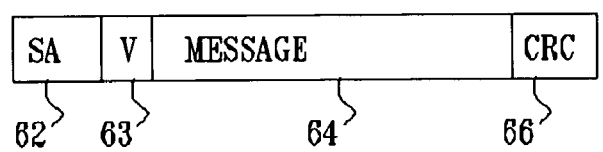
FIG. 4 is a block diagram that schematically illustrates an arbitration message packet exchanged between access points in a WLAN system, in accordance with an embodiment of the present invention.

FIG. 4 is a block diagram that schematically illustrates a broadcast packet 60 sent over LAN 28 by one of access points 22, in accordance with an embodiment of the present invention. Packet 60 is generated by low-latency MAC layer 46 in order to convey arbitration messages to the other access points upon receiving uplink communications from one of mobile stations 24, as described below with reference to FIG. 5. If Ethernet MAC layer 42 is in the process of transmitting an Ethernet frame when the low-latency MAC layer generates packet 60, COMBO layer 50 interleaves packet 60 into the Ethernet frame, as described hereinbelow.

Packet 60 comprises a source address (SA) 62, a message body 64 and an error checking code 66, typically a cyclic redundancy code (CRC), as is known in the art. Typically, the packet additionally comprises a version number code 63. The sequence of the elements of the packet may differ from that shown in the figure. For some applications, the length of packet 60 is 32 bits, of which SA 62 is 5 bits, version number code 63 is one bit, message body 64 is 18 bits, and error checking code 66 is 8 bits. Message body 64 may comprise a wireless channel number in order to support a plurality of PHYs per access point on a single Ethernet link. Other packet lengths, shorter or longer than 32 bits, may also be used, although for rapid communications between the access points, it is desirable that packet 60 be as short as possible, most preferably no more than 32 bits. Thus, SA 62 simply identifies the sending access point, in a unique, proprietary format, which also allows hub 26 to recognize the packet as a broadcast packet. Since the hub distributes the packet to all the access points, there is no need for a destination address.

Hub 26 not only has the capabilities of a standard Ethernet switching hub, but also has added hardware and software capabilities that enable it to recognize packet 60 and distribute it with highest priority. For this purpose, hub 26 typically includes dedicated broadcast and packet interleaving circuitry and/or software. Otherwise, the standard 802.3 switching circuits would regard packet 60, or a frame in which packet 60 is interleaved, as erroneous and would therefore drop it. Typically, hub 26, like access point 22, implements COMBO layer 50 between the standard PMA layer of the PHY layer and two different MAC layers: the standard 802.3 switching MAC and the novel low-latency broadcast MAC of the present invention. The COMBO layer in the hub recognizes packet 60 inside an incoming frame, and if necessary, interleaves this packet into outgoing frames that it is sending to access points 22. Since 100BASE-TX uses synchronous links ("always on"), hub 26 typically includes an elastic buffer (not shown) for use in broadcasting packet 60 from one input port to many output ports in parallel.

Message body 64 identifies the mobile station that sent the uplink message reported by packet 60. For efficient communications, the mobile station identification is abridged, by hashing to a 16-bit code, for example. Message processor 37 in each of the access points receiving packet 60 decodes SA 62 and message body 64. The message processor thus resolves the identities of both the mobile station that sent the uplink message and the access point that received the uplink message and issued packet 60. Based on the contents of packets that it receives and the times at which it receives them, the message processor decides whether this access point should respond to the uplink message. Typically, the first access point to send out an arbitration packet in response to a given uplink message is chosen to respond to the message. Optionally, message body 64 may include other parameters, such as the power level of the received uplink message and/or an identification of the antenna on which the access point received the message. (For diversity purposes, access points generally have multiple antennas.) These additional parameters may be used, in addition to or instead of the time of receipt of packet 60, in arbitrating among the access points.

Code 66 is typically an 8- or 16-bit CRC, which is used by message processor 37 to verify the correctness of the contents of packet 60. Typically, code 66 uses a different coding scheme from that provided by the 802.3 standard. As a result, if packet 60 is accidentally passed to Ethernet MAC processor 36, the Ethernet MAC layer will be unable to correctly decode the CRC and will therefore discard the packet.

Figure 5:
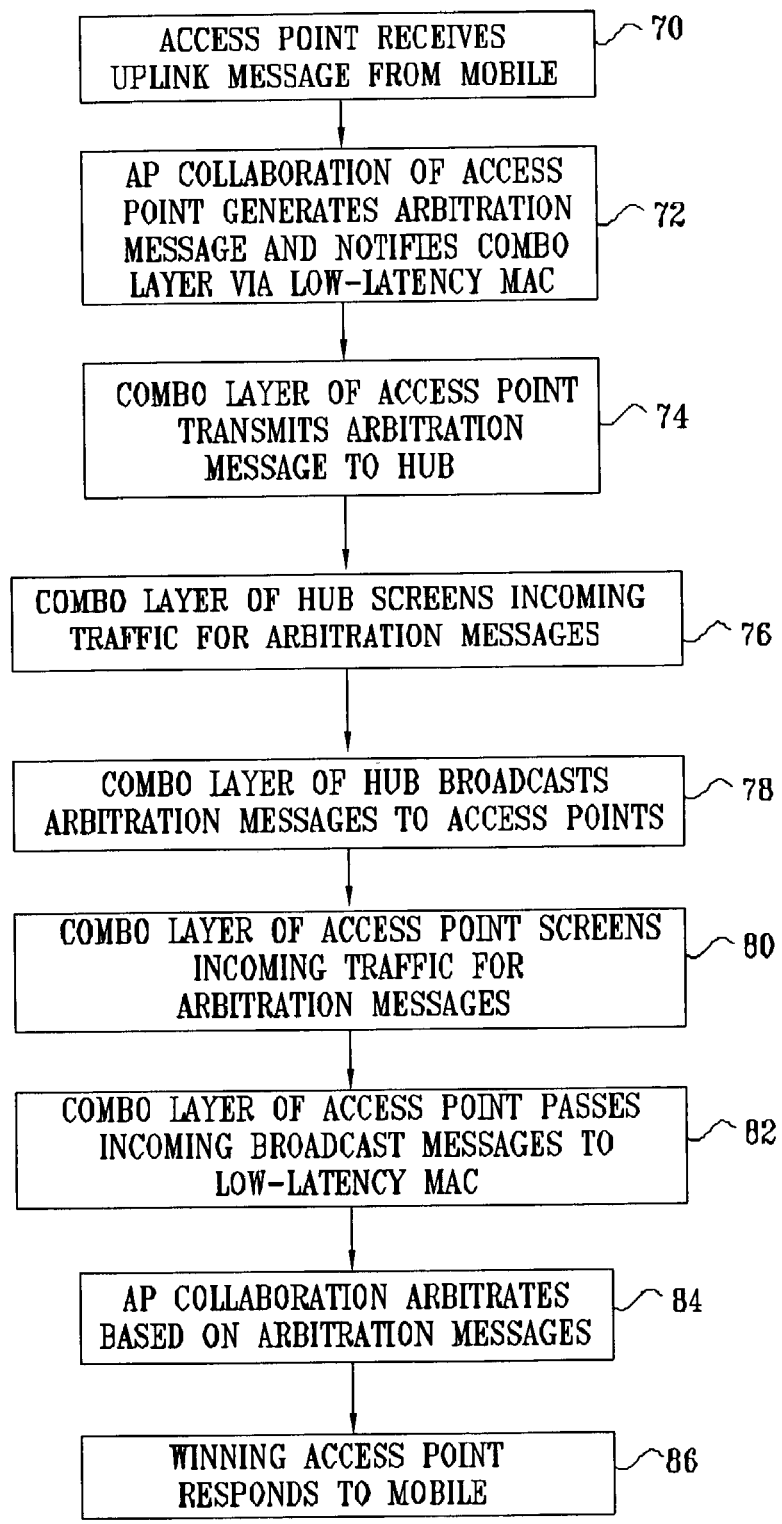
FIG. 5 is a flow chart that schematically illustrates a method for arbitrating among wireless access points in a WLAN system, in accordance with an embodiment of the present invention.

FIG. 5 is a flow chart that schematically illustrates a method for establishing communications between mobile station 24 and one of access points 22 in system 20, in accordance with an embodiment of the present invention. Further details of this method are described in the above-mentioned U.S. patent application Ser. No. 10/214,271 (which uses a dedicated, shared medium to exchange arbitration messages between the access points, rather than LAN 28). Access points 22 transmit beacon signals on their common frequency channel, giving the time base with which the mobile station should synchronize its communications and indicating the BSS identification (BSSID) of the access point. In 802.11 WLAN systems known in the art, each access point has its own unique BSSID. In system 20, however, multiple access points share the same BSSID, so that they appear logically to the mobile station to be a single, extended, distributed access point, which has multiple antennas at different locations. The time bases of the access points are mutually synchronized using synchronization messages sent over LAN 28 (in the form of packet 60), and the beacon signals transmitted by the access points are interlaced to avoid collision between them.

When mobile station 24 receives a beacon signal of sufficient strength, it extracts the BSSID and time base from the signal, and uses them to send an uplink message, which is received by one or more of the access points, at an uplink step 70. The actions of the mobile station in this and other steps are completely in accordance with the 802.11 standard. In other words, the present invention can be implemented in a manner that is by definition transparent to and requires no modification of existing mobile stations. Typically, the first uplink signal sent by the mobile station is an association request message that is addressed to the BSSID and indicates the MAC address of the mobile station. Following this uplink message, one—and no more than one—of the receiving access points must return an ACK to mobile station 24 within the 10 μs IFS limit, as explained above.

To determine which of the access points will respond to the association request message, access points 22 carry out an arbitration procedure using LAN 28. For this purpose, message processors 37 in all access points that received the uplink message from mobile station 24 prepare broadcast packets 60, at a packet generation step 72, in order to give notice to the other access points that they have received an uplink message. Low-latency MAC layer 46 notifies COMBO layer 50 that it has a packet ready to transmit, typically by setting a transmit enable flag For example, assuming the low-latency MAC and COMBO layers communicate in accordance with the MII defined by the 802.3 standard, the low-latency MAC layer asserts the TX_EN signal synchronously with the first nibble of the transmitted packet. It continues to assert this flag until the entire packet has been transmitted.

As soon as low-latency MAC layer 46 of message processor 37 notifies COMBO layer 50 of multiplexer 35 of access point 22 that it has an arbitration message to transmit, the COMBO layer transmits the arbitration message to hub 26, at a transmission step 74. This low-latency transmission is performed using preemption and interleaving techniques described hereinbelow with reference to FIGS. 6 and 7.

In order to receive the arbitration message, COMBO layer 50 of hub 26 continuously screens incoming Ethernet frames for arbitration messages, at a hub screening step 76. When the COMBO layer of hub detects an arbitration message in an Ethernet frame, the COMBO layer extracts the message from the frame. Such screening and extraction are performed using techniques described hereinbelow with reference to FIG. 8. At a broadcast step 78, the COMBO layer of the hub broadcasts the arbitration message to all access points 22, using the preemption and interleaving techniques described hereinbelow with reference to FIGS. 6 and 7.

The COMBO layers of all access points 22 screen incoming Ethernet frames for the broadcast messages sent over LAN 28, at an access point screening step 80. When the COMBO layer of an access point detects an arbitration message in an Ethernet frame, the COMBO layer extracts the message from the frame. Such screening and extraction are performed using techniques described hereinbelow with reference to FIG. 8. The COMBO layer immediately passes the arbitration message to low-latency MAC 46 of the access point, at an access point message passing step 82. The MAC layer passes the message information to collaboration layer 48, which arbitrates among the access points that sent arbitration messages, at an arbitration step 84, in order to determine which access point will respond to the uplink message received at step 70. The same arbitration takes place at all the access points. Each access point is able to determine whether it was first to send its arbitration message, or whether another access point preceded it, by comparing the time of receipt of these broadcasted messages to the time at which the access point sent its own arbitration message. (Access points operating on other frequency channels, as well as access points on the same frequency channel that did not receive an uplink signal from the mobile station identified in the broadcast message, may ignore the message.)

Typically, the access point that was able to send its arbitration message first in response to an uplink message from a given mobile station is in a good position to continue communications with the mobile station. Therefore, all the access points independently choose this first access point to respond to mobile station 24. The 802.11 standard supports a large range of data rates for transmission (1 to 54 Mb/s). The mobile station tries to transmit packets as fast as possible, link permitting. Therefore, in general, only the access points that are close enough to the mobile station to receive the high-rate transmission will be in contention to serve the mobile station, and the winning access point must implicitly be among the best receivers of the uplink message in question.

Alternatively or additionally, other criteria, such as received signal power, may be applied in choosing the "winning" access point, as long as the criteria are applied uniformly by all the access points. Typically, if a deadlock occurs (such as when two access points send their broadcast messages at the same instant), a predetermined formula, which may be based on the received signal power, is applied by all the access points to resolve the deadlock uniformly.

The winning access point sends the required ACK message to mobile station 24, at an acknowledgment step 86. As noted above, the ACK must be sent within a short time, typically 10 µs, and steps 70-86 must all be completed within this time. Access points 22 are able to meet this time constraint by using LAN 28 in the manner described above. After sending the ACK, the winning access point typically sends an association response message to mobile station 24, and then continues its downlink transmission to the mobile station as appropriate.

The winning access point continues serving the mobile station until the mobile station sends another uplink message. The arbitration protocol described above is then repeated. A different access point may be chosen to serve the mobile station in the next round, particularly if the mobile station has moved in the interim. Even if the mobile station has moved, there is no need to repeat the association protocol. As noted above, all the access points belong to the same BSS, as though they were a single extended access point. Therefore, the same association of the mobile station is therefore maintained even if the arbitration process among the access points chooses a different "winner" to respond to the next uplink packet from the mobile station.

Figure 6:
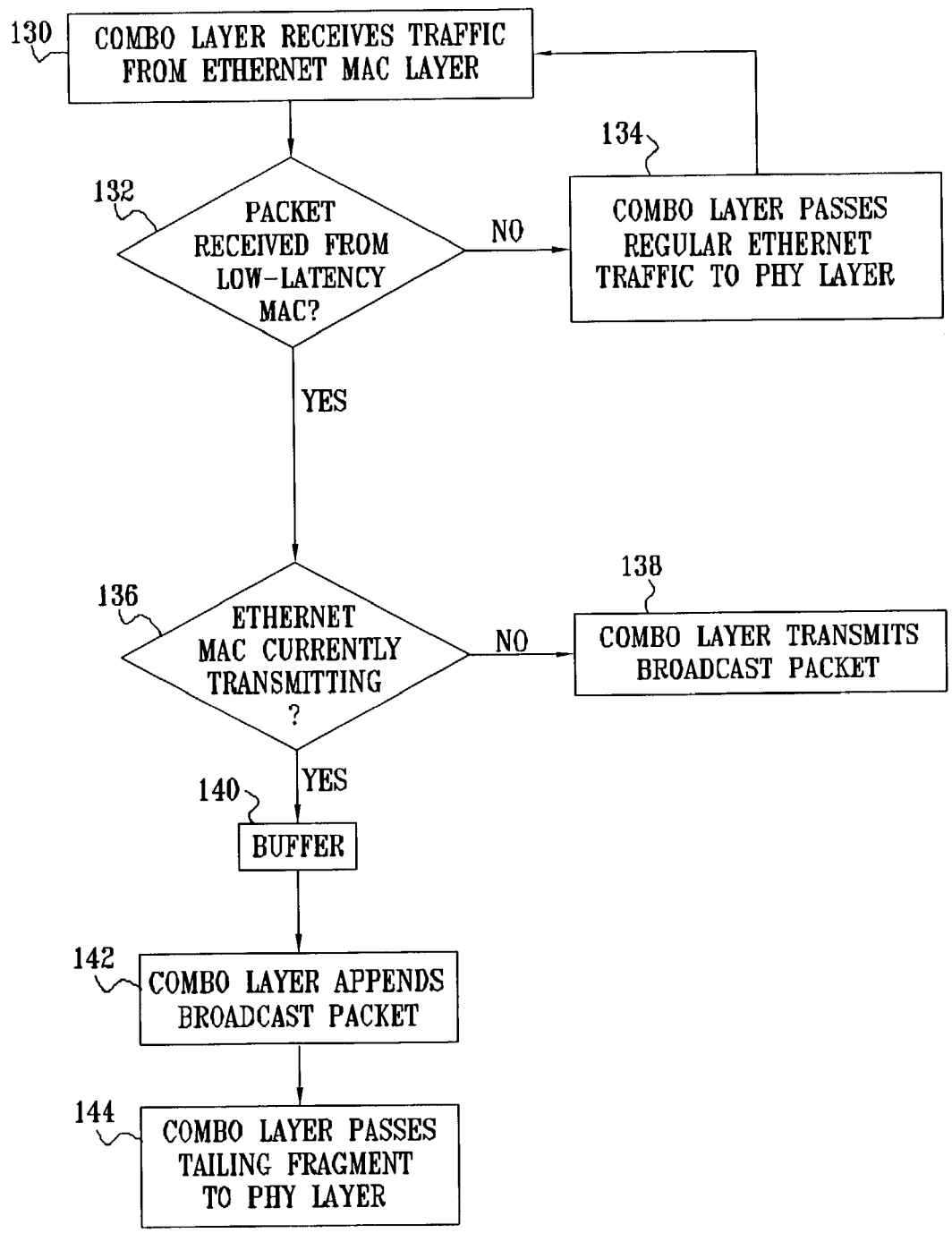
FIG. 6 is a flow chart that schematically illustrates a method for interleaving a broadcast packet into a regular MAC frame, in accordance with an embodiment of the present invention.

Reference is now made to FIGS. 6 and 7, which are a flow chart and a block diagram, respectively, that schematically illustrate a method for interleaving broadcast packet 60 (which represents an arbitration message) into a regular MAC frame 90, in accordance with an embodiment of the present invention. COMBO layer 50 uses this method in order to perform steps 74 and 78, described hereinabove with reference to FIG. 5. In FIG. 7, regular MAC frame 90 is shown, comprising a standard 8-bit Start Frame Delimiter (SFD) 92, a body 94 of M octets 96 (numbered 0 through M), and a standard Ethernet 32-bit Frame Check Sequence (FCS) 98 (the octets of which are numbered 0 through 3). In the Ethernet standard, the standard SFD field is the sequence 10101011 (referred to herein as "0x5D"). In addition to representing MAC client data, octets 96 of body 94 represent other standard MAC fields generated by Ethernet MAC layer 42, including header fields such as destination and source addresses. Although the methods of FIGS. 6, 7 and 8 are described with reference to the 802.3 standard and 32-bit arbitration messages, the principles of these methods are readily applicable to other networking standards and/or arbitration message lengths, mutatis mutandis. Ethernet MAC layer 42 passes regular Ethernet traffic via MII 52 to COMBO layer 50, as the MAC layer would normally pass traffic via an ordinary MII. (Data are conventionally passed between the MAC and PHY layers in the form of nibbles or dibits, but for the sake of simplicity, the description below refers to passing octets.) The Ethernet MAC layer is unaware of and unaffected by the presence of the COMBO layer. Such regular Ethernet traffic is received by COMBO layer 50, at a regular traffic receipt step 130.

While receiving such regular Ethernet traffic (and also when it is not receiving Ethernet traffic), COMBO layer 50 monitors whether it has received an arbitration message from low-latency MAC 48, at a message receipt checking step 132. If no message has been received, the COMBO layer passes the regular Ethernet traffic, unmodified, to MII 54 of PHY 41, at a regular traffic passing step 134. The COMBO layer asserts the TX_EN signal synchronously with the first nibble of the transmitted traffic. It continues to assert this flag until an entire packet has been transmitted. Steps 130 through 134 are repeated until an arbitration message is received.

When a broadcast packet is received, the COMBO layer determines whether Ethernet MAC layer 42 is currently transmitting a regular MAC frame, at a transmission check step 136. If the Ethernet MAC layer is not currently transmitting, COMBO layer 50 immediately transmits the packet via the LAN, at a transmission step 138. The COMBO layer typically performs such transmission by generating a special frame comprising: the control symbols "JK", four octets containing the broadcast packet, and the control symbols "TR". (The receiving COMBO layer will not misconstrue this special frame as a regular Ethernet frame because regular Ethernet frames must always have a length of at least 64 octets.)

On the other hand, if the Ethernet MAC layer is currently transmitting a regular MAC frame, COMBO layer 50 interleaves the broadcast packet into the current transmission. To perform this interleaving, the COMBO layer fragments regular MAC frame 90 into a leading fragment 100 and a tailing fragment 102 (FIG. 7), and appends the broadcast packet onto the leading fragment, as follows. At a buffering step 140, the COMBO layer stores additional octets of the regular MAC frame in an elastic FIFO buffer, as these additional octets arrive from Ethernet MAC layer 42. The COMBO layer completes transmission of the MAC octet currently being transmitted (octet N). In FIG. 7, the COMBO layer is shown preempting transmission of regular MAC frame 90 at interruption point I. Prior to the preemption, the COMBO layer passed octets 0 through N to PHY 41. Immediately after passing octet N, the COMBO layer passes the four octets of broadcast packet 60 to PHY 41, at a packet appending step 142. The COMBO layer then generates an end-of-frame signal (by de-asserting TX_EN), indicating to the PHY the completion of transmission of leading fragment 100.

At a tailing fragment generation step 144, the COMBO layer generates and passes tailing fragment 102 to PHY 41. To begin transmission of the tailing fragment, the COMBO layer generates a start-of-frame signal, by asserting TX_EN. Tailing fragment 102 begins with a novel SFD 104, which may have any value other than that of the standard SFD, i.e., not 0x5D. A body 106 of the tailing fragment comprises octets N+1 through M of regular MAC frame 90, at least some of which octets have typically been buffered at step 140. The tailing fragment ends with standard Ethernet 32-bit FCS 98, as generated by Ethernet MAC layer 42 and passed to the COMBO layer after octet M.

If COMBO layer 50 receives another broadcast packet from low-latency MAC 46 while the COMBO layer is generating tailing fragment 102, the COMBO layer typically preempts the transmission of the tailing fragment and interleaves the broadcast packet therein. This interleaving is performed using the methods described hereinabove with reference to steps 142 and 144, treating the portion of the tailing fragment that has already been passed to the PHY as though it were another leading fragment 100.

As mentioned above, the operation of COMBO layer 50 is transparent to Ethernet MAC layer 42 at both the transmitting and receiving nodes of the LAN. (COMBO layer 50 may add a small amount of latency and affect the interpacket gap (IPG).)

FIFO buffer 38 (FIG. 2) is typically configured to hold octets 96 of regular MAC frames when the frame transmission is interrupted by COMBO layer 50 to send a broadcast packet. The use of the FIFO buffer allows Ethernet MAC layer 42 to continue generating the frame without interruption, even though actual transmission of the frame by the COMBO layer is preempted for the duration of the broadcast packet. The octets of the Ethernet frame are simply held in the buffer until the broadcast packet has been sent. The size of the buffer should thus be at least as large as one packet 60 plus SFD 104 plus an IPG, which, pursuant to the standard, is equivalent to 12 octets (although some PHY implementations require as few as four octets for the IPG). If more than one broadcast packet is likely to be transmitted within the time it takes to transmit a single Ethernet frame, the buffer may be enlarged, and the Ethernet frame is delayed accordingly. If the delay of the Ethernet frame exceeds the buffer size (because multiple broadcast packets are transmitted in close succession), it may be necessary to drop the Ethernet frame.

FIG. 8 is a flow chart that schematically illustrates a method for screening and extracting broadcast packets (which represent arbitration messages) from a regular Ethernet stream of octets, in accordance with an embodiment of the present invention. This method is used to perform steps 76 and 80, described above with reference to FIG. 5. At a buffering step 110, octets received in the stream from PHY 41 are buffered by COMBO layer 50 in an elastic FIFO buffer. The FIFO buffer typically holds four octets when a stream is being received. The COMBO layer continuously checks the octets for an end-of-frame signal, at an end-of-frame check step 112. As long as no end-of-frame signal is received, the COMBO layer releases the octets from the FIFO buffer, at a buffer release step 114. The released octets are passed to Ethernet MAC layer 42, for normal processing by the MAC layer. New octets are continuously buffered, as the method loops through steps 110, 112 and 114.

On the other hand, when COMBO layer receives an end-of-frame signal, it examines the four octets most recently received from PHY 41, which are currently held in the FIFO buffer. Unless a transmission error has occurred, these four octets represent either (a) the standard 32-bit FCS at the end of a standard Ethernet MAC frame, or (b) a 32-bit broadcast packet at the end of a leading fragment, which was generated as described hereinabove with reference to FIGS. 6 and 7.

Thus, at a frame check step 116, the COMBO layer determines whether a frame or fragment has just been received. This determination is typically made by calculating the CRC-32 of the octets of the current frame/fragment (which have already been received and passed to Ethernet MAC layer 112), and comparing this calculated CRC-32 to the value of the four octets. If the values are equal, a determination is made that a frame has just been received, and the four octets, which represent the FCS, are passed to Ethernet MAC layer 42, along with an end-of-frame signal, at a frame pass step 118. The Ethernet MAC layer processes the received frame, including the FCS, using ordinary Ethernet processing techniques. The method returns to step 110 as additional octets are received by the COMBO layer from PHY 41.

If, on the other hand, the calculated CRC-32 at step 116 does not match the value of the last four octets, the COMBO layer determines whether the four octets represent a broadcast packet, at a broadcast packet check step 120. This determination is typically made by checking the validity of the CRC-8 included in the packet. If the CRC is valid, the COMBO layer passes the four-octet broadcast packet to low-latency MAC 46 (optionally via MII 52), at a low-latency MAC pass step 122, as described hereinabove with reference to step 82 of FIG. 5. These four octets are removed from the FIFO buffer without being sent to Ethernet MAC layer 42.

At this point in the method, following step 122, octets 0 through N of frame 90 (FIG. 7) have been received by the COMBO layer and passed to Ethernet MAC layer 42. In order to complete the transmission of frame 90, octets N+1 to M and FCS 98 must be received and passed to the Ethernet MAC layer. As described hereinabove with reference to FIGS. 6 and 7, these octets are included in tailing fragment 102. At the conclusion of the IPG following the end of the broadcast packet, the COMBO layer begins to receive a new segment, starting with an SFD. Based on the value of the SFD, the COMBO layer determines whether the new segment is (a) a new independent regular MAC frame, or (b) the tailing fragment associated with the leading fragment already received, at a new frame determination step 124.

If the value of the SFD is not equal to 0x5D, the segment is deemed to be the expected tailing fragment. In this case, at a tailing fragment pass step 126, the COMBO layer passes the octets that it receives to Ethernet MAC layer 42, until the COMBO layer receives an end-of-frame signal from the PHY. These octets consist of octets N+1 through M, and FCS 98 (FIG. 7). The COMBO layer concludes the transmission of the frame by sending an end-of-frame signal to the Ethernet MAC layer. (If a second broadcast packet has been appended to the tailing fragment, as described above with reference to FIGS. 6 and 7, the COMBO layer typically extracts this broadcast packet using the same method used to extract the first broadcast packet. The octets received following the receipt of the broadcast packet are expected to represent yet another tailing fragment. The size of the FIFO buffer may need to be increased to accommodate the interleaving of multiple broadcast packets in a single regular Ethernet frame.)

The Ethernet MAC layer, unaware of the extraction of the broadcast message by the COMBO layer at step 122, processes the combined leading and tailing fragments as a single frame, following step 126. The Ethernet MAC layer uses normal Ethernet processing techniques, including checking the FCS. (Alternatively, certain functions of the Ethernet MAC and COMBO layers may be combined, so that the FCS is checked only once, rather than twice as described above—once by the COMBO layer at step 116, and a second time by the Ethernet MAC layer.) The method carried out by the COMBO layer returns to step 110 as additional octets are received by the COMBO layer from PHY 41.

On the other hand, if the value of the SFD is found at step 124 to be equal to 0x5D, the present fragment represents a new Ethernet frame. In this case the COMBO layer drops any buffered octets, at a clear buffer step 128, and begins receipt of the new frame at step 110. The Ethernet MAC layer, using conventional processing techniques, discards the corrupted partial frame that has already been received.

Returning to step 120, if the COMBO layer determines that the last four octets of the segment it has just received do not represent a broadcast packet, the COMBO layer discards the four octets and signals end-of-frame to Ethernet MAC layer 42, at a discard step 130, and returns to step 110. The Ethernet MAC layer, using conventional processing techniques, discards the corrupted partial frame that has been received. It is to be noted that screening for and extracting of broadcast packets from the stream of octets is completely transparent to the Ethernet MAC layer. Although the Ethernet MAC layer may encounter a brief delay in the midst of a frame due to extraction of the broadcast packet, this delay does not prevent the Ethernet MAC layer from processing the entire frame in the normal manner. After receiving an entire frame, the Ethernet MAC layer inspects the FCS, which is unaffected by the interleaving of the broadcast packet, as mentioned above.

Various alternative methods may be used for interleaving broadcast messages in Ethernet MAC frames, and for recognizing the interleaved messages when they are received. For example, interleaving of a broadcast message in an Ethernet MAC frame may be performed by inserting an identifier preamble to mark the location of the message in the MAC frame. The receiving COMBO layer screens for broadcast packets by looking for the identifier preamble. The identifier may comprise one or more five-bit code-groups, as described in Clause 24 of the 802.3 standard. These code groups are inserted in the PHY layer, which must therefore be modified if this implementation is to be used.

As another alternative, the COMBO layer may skip checking the full FCS at frame check step 116, and may simply check the CRC-8 of the last four octets in the segment it has received. If this CRC matches the value of the CRC included in the last octet of the segment, the COMBO layer concludes that (a) a leading fragment, rather than a complete Ethernet frame, has just been received, and (b) the last four octets represent a broadcast packet. Otherwise, the COMBO layer passes the last four octets from the buffer to the Ethernet MAC layer. The Ethernet MAC layer will determine whether these four octets contain the correct FCS and, if not, it will discard the segment as invalid.

As yet another alternative, at frame check step 116, the COMBO layer may determine whether it has just received the end of an Ethernet frame by checking whether the SFD of the following segment is equal to 0×5D. If the SFD equals 0×5D, the COMBO layer concludes that it has just received a complete Ethernet frame, rather than a leading fragment. If the SFD does not equal 0×5D, the COMBO layer determines whether the most recent four octets, which are still buffered, represent a broadcast packet, at step 120.

Further alternative methods for interleaving short, low-latency messages into MAC layer frames will be apparent to those skilled in the art, and are considered to be within the scope of the present invention.

The LAN communication architecture shown in FIG. 2 and the protocol stack shown in FIG. 3 are useful not only in improving the coverage of WLAN systems, as described above, but also in other network communication contexts. As noted above, the present invention may thus be employed to provide nodes in a LAN with dual MAC capabilities: a medium-latency MAC layer, such as an Ethernet MAC layer, used for general data communications; and a separate low-latency MAC layer, which is invoked when needed for sending short, urgent messages. Low-latency MAC layer 46 can be used, for example, for synchronization and control signals that require low latency, and therefore cannot be accommodated by Ethernet MAC layer 42. The low-latency MAC and COMBO layers of the present invention can similarly be used in a dual-MAC configuration alongside other types of MAC and data link protocol layers known in the art. For example, the low-latency MAC layer could be used in a real-time location system, to use multiple radio propagation measurements to locate people in an office building or plant. Thus, although embodiments of the present invention have been described herein with reference to "arbitration messages" and/or "broadcast packets," other immediate messages and packets can be substituted when the present invention is used in other network communication contexts.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for mobile communication, comprising:

arranging a plurality of access points in a wireless local area network (WLAN) to communicate on a common frequency channel with a mobile station;

linking the access points together by cables in a wired local area network (LAN), so as to convey frames of data to and from the mobile station via the LAN;

receiving at one or more of the access points an uplink signal transmitted over the WLAN by the mobile station on the common frequency channel;

responsively to receiving the uplink signal, sending one or more messages over the LAN among the access points by interleaving the messages in one or more of the frames of the data;

arbitrating among the access points based on the messages so as to select one of the access points to respond to the uplink signal; and transmitting a response from the selected one of the access points to the mobile station, wherein linking the access points to convey the frames of the data comprises configuring the access points to convey the frames in accordance with a first media access control (MAC) protocol characterized by a first latency, and wherein sending the messages comprises using a second MAC protocol, having a second latency lower than the first latency, to send the messages responsively to receiving the uplink signal.

2. A method according to claim 1, wherein sending the one or more messages comprises breaking at least one of the frames of the data into a leading fragment and a tailing fragment, and appending one of the messages to the leading fragment.

3. A method according to claim 2, wherein breaking the at least one of the frames of the data comprises beginning the tailing fragment with a Start Frame Delimiter (SFD) different from the SFD normally used to begin a frame of data.

4. A method according to claim 2, wherein arbitrating among the access points comprises receiving the one or more messages at the plurality of access points by screening the frames of data so as to detect the one or more messages, and, responsively to such detection, extracting the one or more messages from the one or more of the frames of the data.

5. A method according to claim 4, wherein screeningthe frames of data comprises determining whether a sequence of bits in one of the frames representsa valid error detection code for aportion of the frame.

6. A method according to claim 4, wherein receiving the one or more messages comprises temporarily holding a portion of the data in one of the frames in a first-in-first-out buffer during the screening.

7. A method according to claim 1, wherein sending the one or more messages by interleaving comprises temporarily holding a portion of the data in the one or more frames in a first-in-first-out buffer during the interleaving.

8. A method according to claim 1, wherein the first MAC protocol comprises an Ethernet protocol.

9. A method according to claim 8, wherein linking the access points to convey the frames of the data comprises passing the frames in accordance with a standard Media-Independent Interface (MII) between physical and MAC layers of the Ethernet protocol.

10. A method according to claim 1, wherein sending the one or more messages comprises sending broadcast messages from the access points receiving the uplink signal to the plurality of the access points.

11. A method according to claim 10, wherein linking the access points together comprises linking each of the access points to a hub via the LAN, and wherein sending the broadcast messages comprises sending the broadcast messages from the access points receiving the uplink signal to the hub, and from the hub to the plurality of the access points.

12. A method according to claim 1, wherein arbitrating among the access points comprises receiving and processing the messages at each of the plurality of the access points, so that each of the one or more of the access points receiving the uplink signal determines which one of the access points is to be selected to respond to the uplink signal.

13. A method according to claim 12, wherein processing the messages comprises selecting, responsively to the messages, the one of the access points that was first to receive the uplink signal.

14. A method according to claim 1, wherein the access points have respective service areas, and wherein arranging the plurality of the access points comprises arranging the access points so that the service areas substantially overlap.

15. A method according to claim 1, wherein arranging the plurality of the access points comprises arranging the access points to communicate with the mobile station substantially in accordance with IEEE Standard 802.11.

16. A method according to claim 15, wherein arbitrating among the access points comprises selecting the one of the access points to respond to the uplink signal within a time limit imposed by the IEEE Standard 802.11 for acknowledging the uplink signal.

17. A method for network communication, comprising:
linking a plurality of nodes together in a local area network (LAN);
conveying frames of data among the nodes via the LAN in accordance with a first media access control (MAC) protocol; and
sending a message among the nodes over the LAN using a second MAC protocol by interleaving the message in one of the frames of the data,
wherein the first MAC protocol is characterized by a first latency, and the second MAC protocol is characterized by a second latency lower than the first latency.

18. A method according to claim 17, wherein sending the message comprises breaking the frame of the data into a leading fragment and a tailing fragment, and appending the message to the leading fragment.

19. A method according to claim 18, wherein breaking the frame of the data. comprises beginning the tailing fragment with a Start Frame Delimiter (SFD) different from the SFD normally used to begin a frame of data.

20. A method according to claim 18, wherein sending the message comprises receiving the message by screening the frames of data so as to detect the message, and, responsively to such detection, extracting the message from the frames of the data.

21. A method according to claim 20, wherein screening the frames of data comprises determining whether a sequence of bits in one of the frames represents a valid error detection code for a portion of the frame.

22. A method according to claim 20, wherein receiving the message comprises temporarily holding a portion of the data in one of the frames in a first-in-first-out buffer during the screening.

23. A method according to claim 17, wherein sending the message by interleaving comprises temporarily holding a portion of the data in the one of the frames in a first-in-first-out buffer during the interleaving.

24. A method according to claim 17, wherein the first MAC protocol comprises an Ethernet protocol.

25. A method according to claim 24, wherein conveying the frames of the data comprises passing the frames in accordance with a standard Media-Independent Interface (MII) between physical and MAC layers of the Ethernet protocol.

26. A system for mobile communication, comprising:
cables arranged to form a wired local area network (LAN); and
a plurality of access points interconnected by the LAN and arranged in a wireless local area network (WLAN) to communicate on a common frequency channel with a mobile station, the access points being adapted to convey frames of data to and from the mobile station via the LAN, and, upon receiving at one or more of the access points an uplink signal transmitted over the WLAN by the mobile station on the common frequency channel, to send one or more messages over the LAN among the access points by interleaving the messages in one or more of the frames of the data, responsively to receiving the uplink signal, and to arbitrate among the access points based on the messages so as to select one of the access points to respond to the uplink signal, and to transmit a response from the selected one of the access points to the mobile station,
wherein the access points are configured to convey the frames in accordance with a first media access control (MAC) protocol characterized by a first latency, and to send the messages using a second MAC protocol, having a second latency lower than the first latency.

27. A system according to claim 26, wherein the access points are adapted to interleave the messages by breaking at least one of the frames of the data into a leading fragment and a tailing fragment, and appending one of the messages to the leading fragment.

28. A system according to claim 27, wherein the access points are adapted to begin the tailing fragment with a Start Frame Delimiter (SFD) different from the SFD normally used to begin a frame of data.

29. A system according to claim 27, wherein the access points are adapted to receive the one or more messages at the plurality of access points by screening the frames of data so as to detect the one or more messages, and, responsively to such detection, extracting the one or more messages from the one or more of the frames of the data.

30. A system according to claim 29, wherein the access points are adapted to screen the frames of data by determining whether a sequence of bits in one of the frames represents a valid error detection code for a portion of the frame.

31. A system according to claim 29, wherein each of the access points comprises a first-in-first-out buffer, which is adapted to temporarily hold a portion of the data in one of the frames during screening of the data.

32. A system according to claim 26, wherein each of the access points comprises a first-in-first-out buffer, which is adapted to temporarily hold a portion of the data in the one or more frames during the interleaving.

33. A system according to claim 26, wherein the first MAC protocol comprises an Ethernet protocol.

34. A system according to claim 33, wherein the access points are configured to convey the frames of the data by passing the frames in accordance with a standard Media-Independent Interface (MII) between physical and MAC layers of the Ethernet protocol.

35. A system according to claim 26, wherein the one or more messages comprise broadcast messages, sent from the access points receiving the uplink signal to the plurality of the access points.

36. A system according to claim 35, wherein the LAN comprises a hub, linked to each of the access points, wherein the access points receiving the uplink signal are configured to send the broadcast messages to the hub, and wherein the hub is configured to send the broadcast messages to the plurality of the access points.

37. A system according to claim 26, wherein the access points are adapted to receive and process the messages so that each of the one or more of the access points receiving the uplink signal determines which one of the access points is to be selected to respond to the uplink signal.

38. A system according to claim 37, wherein the access points are adapted to select, responsively to the messages, the one of the access points that was first to receive the uplink signal.

39. A system according to claim 26, wherein the access points have respective service areas, and wherein the access points are arranged so that the service areas substantially overlap.

40. A system according to claim 26, wherein the access points are adapted to communicate with the mobile station substantially in accordance with IEEE Standard 802.11.

41. A system according to claim 40, wherein the access points are adapted to select the one of the access points to respond to the uplink signal within a time limit imposed by the IEEE Standard 802.11 for acknowledging the uplink signal.

42. A system for network communication, comprising:
cables arranged to form a wired local area network (LAN); and
a plurality of nodes, which are linked together by the LAN and are adapted to convey frames of data among the nodes via the LAN in accordance with a first media access control (MAC) protocol, and which are further adapted to send a message among the nodes over the LAN using a second MAC protocol by interleaving the message in one of the frames of the data,
wherein the first MAC protocol is characterized by a first latency, and the second MAC protocol is characterized by a second latency lower than the first latency.

43. A system according to claim 42, wherein the nodes are adapted to interleave the message by breaking the frame of the data into a leading fragment and a tailing fragment, and appending the message to the leading fragment.

44. A system according to claim 43, wherein the nodes are adapted to begin the tailing fragment with a Start Frame Delimiter (SFD) different from the SFD normally used to begin a frame of data.

45. A system according to claim 43, wherein the nodes are adapted to receive the message by screening the frames of data so as to detect the message, and, responsively to such detection, extracting the message from the frames of the data.

46. A system according to claim 45, wherein the nodes are adapted to screen the frames of data by determining whether a sequence of bits in one of the frames represents a valid error detection code for a portion of the frame.

47. A system according to claim 45, wherein each of the nodes comprises a first-in-first-out buffer, which is adapted to temporarily hold a portion of the data in the one of the frames during screening of the data.

48. A system according to claim 42, wherein each of the nodes comprises a first-in-first-out buffer, which is adapted to temporarily hold a portion of the data in the one of the frames during the interleaving.

49. A system according to claim 42, wherein the first MAC protocol comprises an Ethernet protocol.

50. A system according to claim 49, wherein the nodes are adapted to convey the frames of the data by passing the frames in accordance with a standard Media-Independent Interface (MII) between physical and MAC layers of the Ethernet protocol.

51. Access point apparatus for deployment in a wireless local area network (WLAN) as one of a plurality of access points for mobile communication, the apparatus comprising:
a radio transceiver, which is configured to communicate on a predetermined frequency channel with a mobile station;
a physical layer interface, for connecting the access point to a wired local area network (LAN) interconnecting the access points; and
processing circuitry, which is adapted to convey frames of data to and from the mobile station via the physical layer interface over the LAN, and, when the transceiver receives an uplink signal transmitted over the WLAN by the mobile station on the predetermined frequency channel, to send and receive messages via the physical layer interface over the LAN to and from the plurality of access points by interleaving the messages in one or more of the frames of the data, and to perform an arbitration among the access points based on the messages so as to select one of the access points to respond to the uplink signal, and to control the transceiver so that the transceiver returns a response to the mobile station subject to the arbitration, wherein the processing circuitry comprises:
a first MAC processor, adapted to convey the frames in accordance with a first media access control (MAC) protocol characterized by a first latency; and
a second MAC processor, adapted to send the messages using a second MAC protocol, having a second latency lower than the first latency.

52. Apparatus according to claim 51, wherein the processing circuitry is adapted to interleave the messages by breaking at least one of the frames of the data into a leading fragment and a tailing fragment, and appending one of the messages to the leading fragment.

53. Apparatus according to claim 52, wherein the processing circuitry is adapted to begin the tailing fragment with a Start Frame Delimiter (SFD) different from the SFD normally used to begin a frame of data.

54. Apparatus according to claim 52, wherein the processing circuitry is adapted to receive the one or more messages at the plurality of access points by screening the frames of data so as to detect the one or more messages, and, responsively to such detection, extracting the one or more messages from the one or more of the frames of the data.

55. Apparatus according to claim 54, wherein the processing circuitry is adapted to screen the frames of data by determining whether a sequence of bits in one of the frames represents a valid error detection code for a portion of the frame.

56. Apparatus according to claim 54, wherein the processing circuitry comprises a first-in-first-out buffer, which is adapted to temporarily hold a portion of the data in the one or more frames during screening of the data.

57. Apparatus according to claim 51, wherein the processing circuitry comprises a first-in-first-out buffer, which is adapted to temporarily hold a portion of the data in the one or more frames during the interleaving.

58. Apparatus according to claim 51, wherein the first MAC protocol comprises an Ethernet protocol.

59. Apparatus according to claim 58, wherein the processing circuitry is adapted to convey the frames of the data by passing the frames in accordance with a standard Media-Independent Interface (MII) between physical and MAC layers of the Ethernet protocol.

60. Apparatus according to claim 51, wherein the one or more messages comprise broadcast messages, sent from the access points receiving the uplink signal to the plurality of the access points.

61. Apparatus according to claim 60, wherein the LAN comprises a hub, linked to the physical layer interface of each of the access points, wherein the processing circuitry is adapted to send the broadcast messages to the hub when the transceiver receives the uplink signal, and wherein the hub is configured to send the broadcast messages to the physical layer interface of each of the plurality of the access points.

62. Apparatus according to claim 51, wherein the processing circuitry is adapted to receive and process the messages so that each of the one or more of the access points receiving the uplink signal determines which one of the access points is to be selected to respond to the uplink signal.

63. Apparatus according to claim 62, wherein the processing circuitry is adapted to select, responsively to the messages, the one of the access points that was first to receive the uplink signal.

64. Apparatus according to claim 51, wherein the access points have respective service areas, and wherein the access points are arranged so that the service areas substantially overlap.

65. Apparatus according to claim 51, wherein the transceiver is adapted to communicate with the mobile station substantially in accordance with IEEE Standard 802.11.

66. Apparatus according to claim 65, wherein the processing circuitry is adapted to select the one of the access points to respond to the uplink signal within a time limit imposed by the IEEE Standard 802.11 for acknowledging the uplink signal.

67. Node apparatus for deployment as one of a plurality of nodes in a local area network (LAN), the apparatus comprising:
a physical layer interface, for connecting the node to the LAN
processing circuitry, which is adapted to convey frames of data among the nodes via the physical layer interface over the LAN in accordance with a first media access control (MAC) protocol, and which is further adapted to send a message among the nodes over the LAN using a second MAC protocol by interleaving the message in one of the frames of the data,
wherein the first MAC protocol is characterized by a first latency, and the second MAC protocol is characterized by a second latency lower than the first latency.

68. Apparatus according to claim 67, wherein the processing circuitry is adapted to interleave the message by breaking the frame of the data into a leading fragment and a tailing fragment, and appending the message to the leading fragment.

69. Apparatus according to claim 68, wherein the processing circuitry is adapted to begin the tailing fragment with a Start Frame Delimiter (SFD) different from the SFD normally used to begin a frame of data.

70. Apparatus according to claim 68, wherein the processing circuitry is adapted to receive the message by screening the frames of data so as to detect the message, and, responsively to such detection, to extract the message from the frames of the data.

71. Apparatus according to claim 70, wherein the processing circuitry is adapted to screen the frames of data by determining whether a sequence of bits in one of the frames represents a valid error detection code for a portion of the frame.

72. Apparatus according to claim 70, wherein the processing circuitry comprises a first-in-first-out buffer, which is adapted to temporarily hold a portion of the data in the one of the frames during screening of the data.

73. Apparatus according to claim 67, wherein the processing circuitry comprises a first-in-first-out buffer, which is adapted to temporarily hold a portion of the data in the one of the frames during the interleaving.

74. Apparatus according to claim 67, wherein the first MAC protocol comprises an Ethernet protocol.

75. Apparatus according to claim 74, wherein the processing circuitry is adapted to convey the frames of the data by passing the frames in accordance with a standard Media-Independent Interface (MII) between physical and MAC layers of the Ethernet protocol.

* * * * *